United States Patent [19]

Hanulec

[11] Patent Number: 4,683,565
[45] Date of Patent: Jul. 28, 1987

[54] PHASE CONTROLLED FREQUENCY DIVISION MULTIPLEXED COMMUNICATIONS SYSTEM

[75] Inventor: Joseph Hanulec, Shoreham, N.Y.

[73] Assignee: ISC Cardion Electronics, Inc., Woodbury, N.Y.

[21] Appl. No.: 712,051

[22] Filed: Mar. 15, 1985

[51] Int. Cl.⁴ .................................................. H04J 1/00
[52] U.S. Cl. ...................................... 370/69.1; 455/70; 375/111
[58] Field of Search ...................... 370/69.1, 120, 123, 370/70, 71; 455/46, 70, 71; 375/50, 77, 57, 111

[56] References Cited

U.S. PATENT DOCUMENTS

| | | | |
|---|---|---|---|
| Re. 31,295 | 6/1983 | Haley et al. | 370/120 |
| 3,182,131 | 5/1965 | Barnes | 455/46 |
| 3,242,262 | 3/1966 | Melas et al. | 375/57 |
| 3,311,828 | 3/1967 | Chasek | 455/46 |
| 3,549,811 | 12/1970 | Borresen | 370/76 |
| 4,356,562 | 10/1982 | Wright | 375/111 |

Primary Examiner—Robert L. Griffin
Assistant Examiner—Stephen Chin

[57] ABSTRACT

The apparatus of this invention is a system for providing frequency synchronization and predictable phase output of the transmitted signals of a multi-channel frequency division multiplexed communications system.

12 Claims, 3 Drawing Figures

PHASE CONTROLLED FREQUENCY DIVISION MULTIPLEXED COMMUNICATIONS SYSTEM

BACKGROUND OF THE INVENTION

1. Field of the Invention

This invention relates to electronic circuits, and more particularly to electronic communication devices.

2. Description of the Prior Art

The transmission of intelligence between distant points not directly connected by an electrical conductor may be accomplished by a radio cummunications system. A typical radio communication system has at least two fundamental components: a transmitter which converts sound variations into electrical variations; and a receiver which converts the electrical variations back into sound. Information was transmitted from a transmitter to a receiver over a specific frequency or channel. Many channels were used for the transmission of information.

One of the techniques employed by the prior art for transmitting additional information over the same channel was frequency division multiplexing. Frequency division multiplexing permits the simultaneous transmission of two or more signals over a single radio frequency. Each channel of a frequency division multiplex system had a separate crystal oscillator. The crystal oscillators were not interchangeable. Thus, if you had a seventy-two channel system, seventy-two different crystal oscillators would be needed to operate the system and at least seventy-two different crystal oscillators would have to be on hand as spares in case a crystal oscillator was defective. As the prior art advanced, frequency synthesizers were developed to replace crystal oscillators. Frequency synthesizers were interchangeable between channels. The above would also apply for frequency division multiplexed systems that utilize a cable for transmission.

Some frequency division multiplex system replaced the crystal oscillators with frequency synthesizers which were interchangeable between channels. The frequency synthesizers were phase ambiguous. Thus, frequency division multiplex systems utilizing frequency synthesizers do not provide a predictable phase shift between their inputs and outputs. An example of the foregoing problem would be when a receiver was in a vehicle travelling between two transmitters on a winding road that may be surrounded by hills and/or other obstructions, the receiver would switch back and forth between each transmitter and the person listening to the receiver would notice clicks every time the receiver switched from one transmitter to another transmitter. Prior to Applicant's invention, there was no frequency division multiplex communication system that utilized frequency synthesizers while providing a predictable phase shift between input and output. Hence, a disadvantage of the prior art was that when a frequency division multiplex system having frequency synthesizers was used in a transitional range between two transmitters, the system would not automatically steer back and forth between each transmitter, so that objectionable sounds would be heard in the audio.

SUMMARY OF THE INVENTION

This invention overcomes the disadvantages of the prior art by providing a frequency division multiplex system that utilizes frequency synthesizers which are switchable between channels while providing a predictable phase output. Predictable phase outputs are important in simulcast, data transmission, facsimile and some video systems, etc. Thus, the apparatus of this invention is a phase aligned system that utilizes interchangeable frequency synthesizers in each channel.

If is an object of this invention to provide a new and improved communications system.

It is another object of this invention to provide a new and improved phase aligned frequency division multiplex communication system that utilizes interchangeable frequency synthesizers in each channel.

It is a further object of this invention to supply phase alignment in a multichannel, single sideband system.

Other objects and advantages of this invention will become apparent as the following description proceeds, which should be considered together with the accompanying drawings.

DESCRIPTION OF A PREFERRED EMBODIMENT

Figure 1:
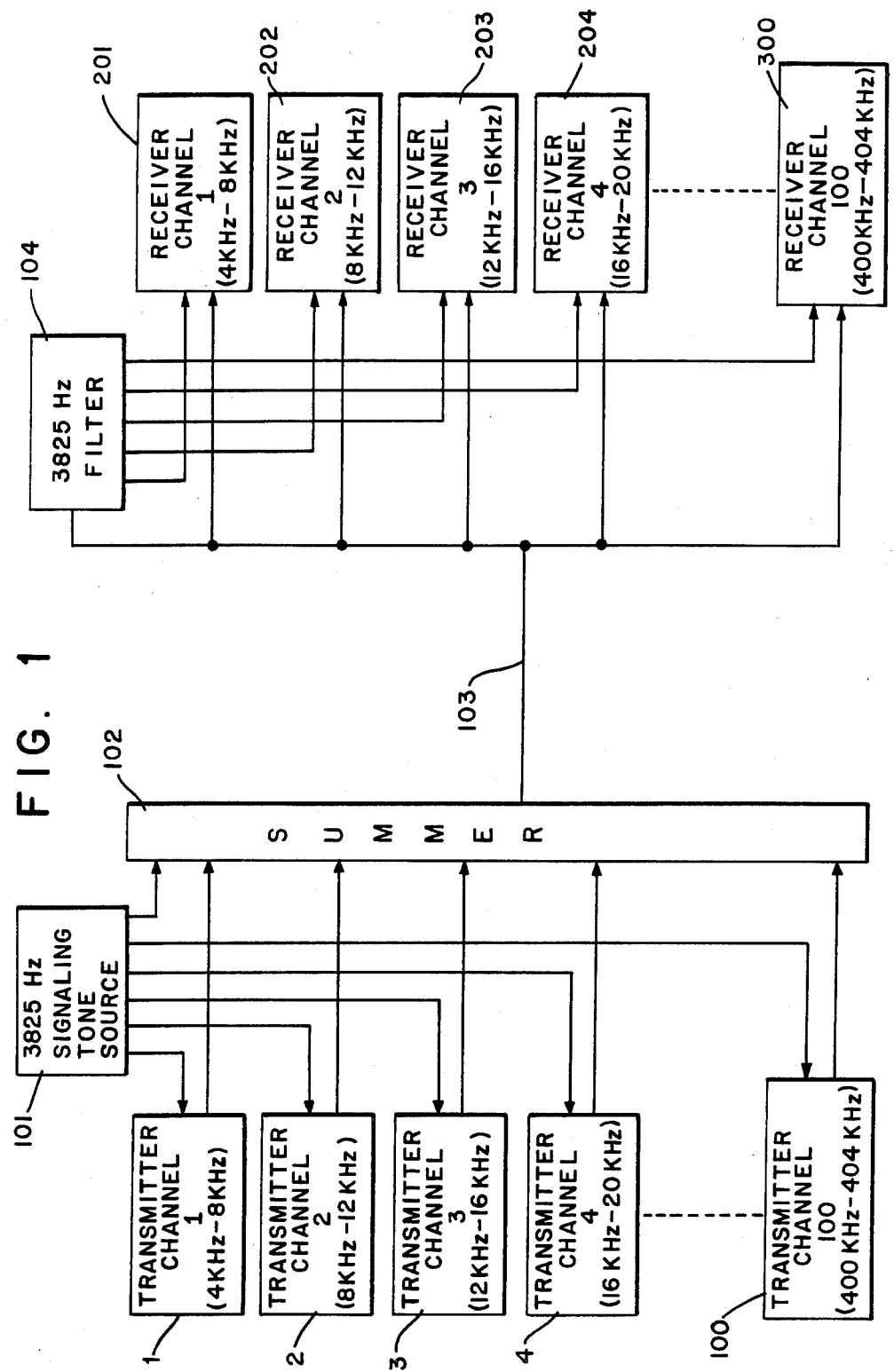
FIG. 1 is a block diagram showing the apparatus of this invention.

Referring now to the drawings in detail and more particularly to FIG. 1, the reference characters 1 to 100 designate a plurality of transmitters of a phase aligned frequency division multiplex communication system. Typically a frequency division multiplex communication system would contain between 2 and 1800 channels. For purposes of this disclosure, we will assume that the communication system contains 100 channels. Each channel will be 4 KHz wide. Even though human hearing covers a range of frequencies from 20 Hz to 20,000 Hz, a band of frequencies from 300 Hz to 3400 Hz is ample to provide speech with good intelligibility, having enough of the characteristic overtones of the voice to make the voices easily recognizable. The additional 900 Hz in band width provides room for a signaling tone and frequency separation between channels. Thus, transmitter 1 will transmit frequencies from 4 to 8 KHz and transmitter 2 will transmit frequencies from 8 to 12 KHz. Transmitter 3 will transmit frequencies between 12 and 16 KHz and transmitter 4 will transmit frequencies between 16 and 20 KHz. Transmitter 100 will transmit frequencies between 400 and 404 KHz.

A 3823 Hz signaling tone source 101 is individually coupled to each of transmitters 1 to 100 and to the summer 102. This tone is above the transmission band of 300-3400 Hz and may be called "out of band signaling". The aforementioned tone is an out of band signaling tone for signaling, frequency synchronization and phase control of the transmitted signals. The aforementioned signaling tone will be more adequately described in the descriptions of FIGS. 2 and 3. Transmitters 1 through 100 and the tone produced by source 101 are coupled to the input of summer 102. Summer 102 adds its input signals and transmits its input via communications link 103, which may be a coaxial cable or microwave link, etc. to the inputs of receivers 201 to 300 and 3825 Hz filter 104. Thus, receiver 201 receives the 4 KHz to 8 KHz channel 1 signal transmitted by transmitter 1 and a filtered signal from filter 104. Receiver 202 receives the 8 KHz to 12 KHz channel 2 signal transmitted by transmitter 2 and a filtered signal from filter 104. Receiver 203 receives the 12 KHz to 16 KHz channel 3 signal transmitted by transmitter 3 and a filtered signal from filter 104. Receiver 204 receives the 16 to 20 KHz channel 4 signal transmitted by transmitter 4 and a filtered signal from filter 104. Receiver 300 receives the 400 to 404 KHz channel 100 signal transmitted by transmitter 100 and a filtered signal from filter 104.

Figure 2:
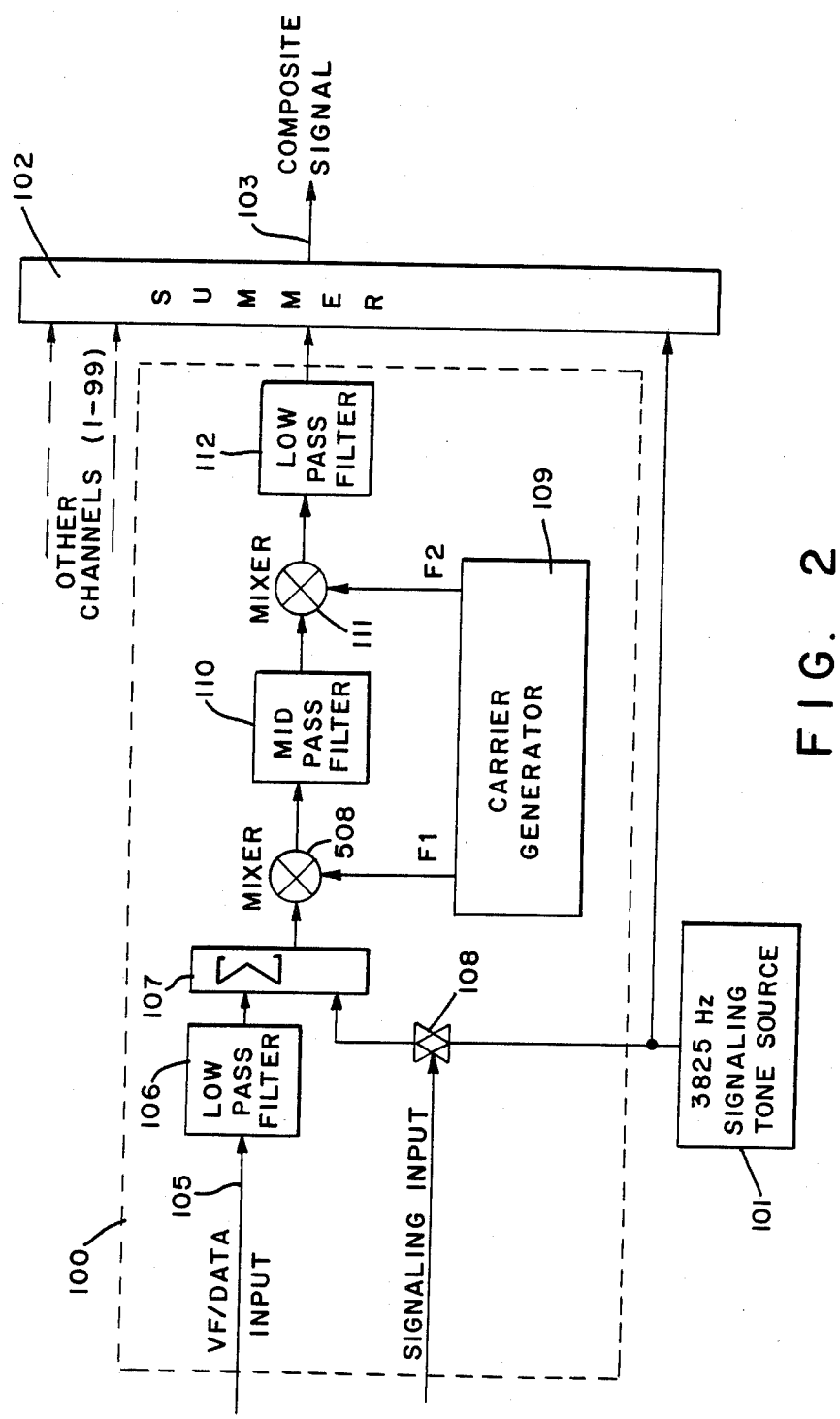
FIG. 2 is a block diagram showing transmitter 100 in greater detail.
Figure 3:
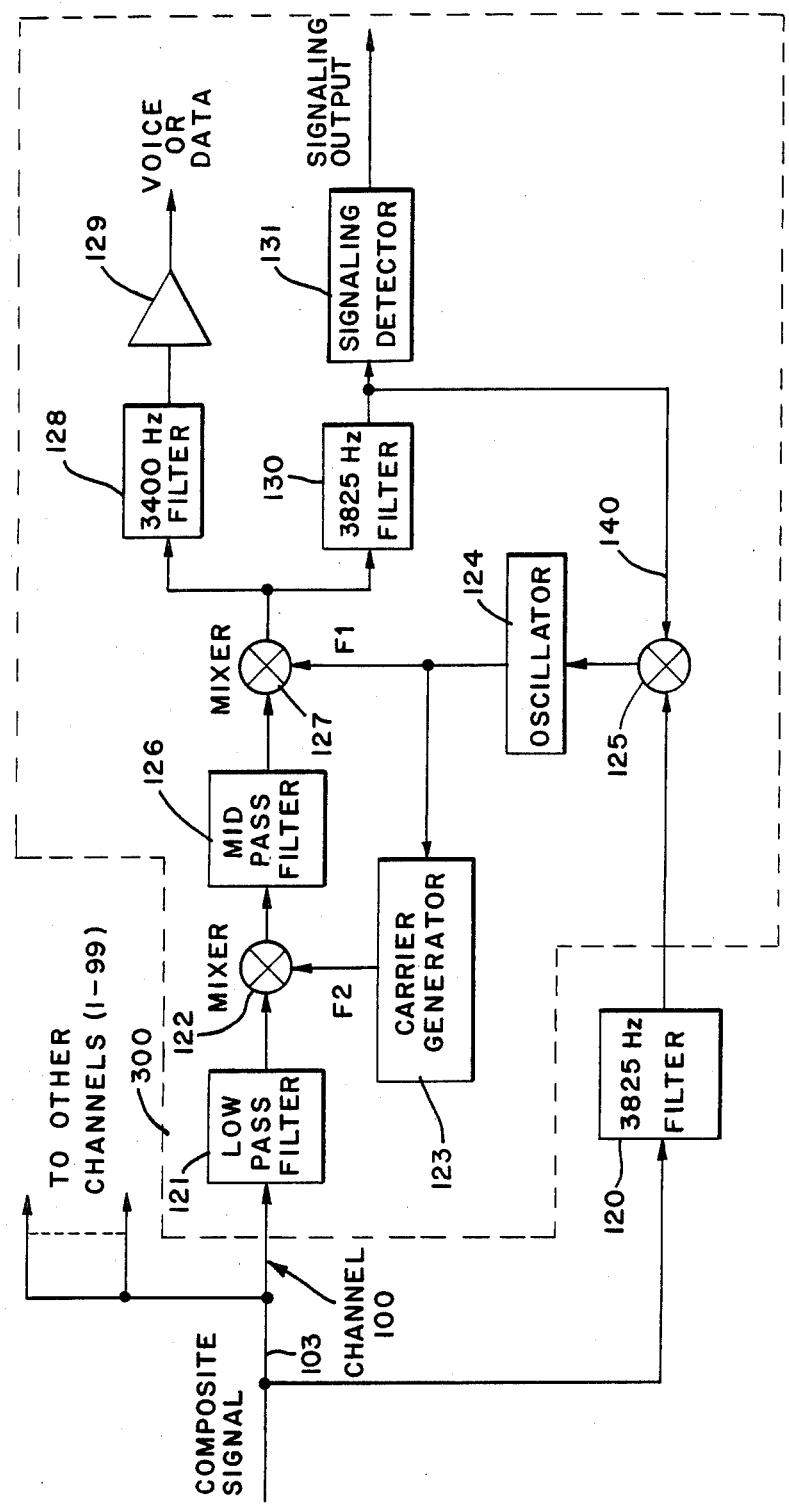
FIG. 3 is a block diagram showing receiver 300 in greater detail.

FIG. 2 shows transmitter 100 in greater detail. Transmitter 100 transmits channel 100 and transmitter 100 contains the same circuitry as transmitters 1 through 99. A voice frequency or data input terminal 105 is coupled to the input of low pass filter 106 and the output of filter 106 is coupled to one of the inputs of summer 107. The second input to summer 107 is the output of transmission gate 108. When gate 108 is closed to indicate the transmission of data or voice signals, summer 107 will receive the output of 3825 Hz signaling tone source 101. The output of tone source 101 is also coupled to the input of summer 102. The output of summer 107 is coupled to one of the two inputs of mixer 508. The second input to mixer 508 is the $F_1$ output of carrier generator 109. The output of mixer 508 is coupled to the input of mid pass filter 110 and the output of filter 110 is coupled to one of the two inputs of mixer 111. The second input to mixer 111 is the $F_2$ output of carrier generator 109. The input to low pass filter 112 is coupled to the output of mixer 111 and the output of filter 112 is coupled to the input of summer 102. Summer 102 also receives the inputs from channels 1 through 99. The output of summer 102 is a composite signal which is transmitted via link 103 to the input of receiver 300 (FIG. 3). Low pass filter 106 restricts the top input voice or data frequencies received from terminal 105 to 3400 Hz so that there will be no cross talk between channels. The signaling input to gate 108 is a push-to-talk switch from a microphone (not shown) or a contact closure (not shown) from a data transmission line. When one of the aforementioned inputs causes gate 108 to close a 3825 Hz tone (a frequency of 3825 Hz was selected because it is within the channel width of 4 KHz and above the frequency of voice transmission) is produced by source 101. The aforementioned 3825 tone will appear on one of the inputs to summer 107. Summer 107 will add the 3825 Hz tone to the data or voice output signal of filter 106. The output of summer 107 is coupled to one of the inputs of mixer 508. Mixer 508 will modulate the output of summer 107 with the carrier $F_1$ frequency of generator 109 to produce a double side band signal. This double side band signal has a frequency greater than the frequency of the voice or data signals. Mid pass filter 110 selects the higher frequency side band of the two side band signals produced by mixer 508. Mixer 111 mixes the aforementioned higher frequency side band signal with the carrier $F_2$ frequency signal produced by generator 109. Carrier generator frequency $F_1$ may be equal to 5.6 MHz and will be the same for receivers 1 through 100, whereas the carrier generator 109 $F_2$ signal varies in frequency each channel by 4 KHz. The frequency of the $F_2$ signal is between 5.0 and 8.14 MHz. Thus, $F_2$ for channel 1 would be 5,604 million Hz and $F_2$ for channel 2 would be 5,608 KHz. $F_2$ for channel 3 would be 5,612 KHz and $F_2$ for channel 4 would be 5,616 KHz etc. $F_2$ for channel 100 would be 6,000. Hence, frequency $F_2$ is switchable for each channel and would establish where the output spectrum for a particular channel would be located. The output of mixer 111 will be an upper and lower side band high frequency signal, which are separate in frequency. The upper side band signal does not pass through filter 112 and the lower side band signal is filtered by low pass filter 112. The output of filter 112 is coupled to the input of summer 102. Summer 102 will add the output of source 101 to the output of filter 112. Summer 102 will also add the foregoing result to the sum of channels 1 to 99. Thus, the output of summer 102 will be a composite signal that is transmitted over communications link 103 to the inputs of receivers 201 through 300.

FIG. 3 shows receiver 300 in greater detail and the manner in which the composite signal transmitted via communications link 103 is distributed to channels 1 through 100. Receiver 300 receives channel 100 and receiver 300 contains the same circuitry as receivers 201 through 299 (not shown). Receivers 201 through 299 receive channels 1 through 99. The composite signal transmitted via link 103 is coupled to the input of 3825 Hz filter 120 and to the input of low pass filter 121. The output of filter 121 is coupled to one of the two inputs of mixer 122. The second input to mixer 122 is the $F_2$ output of carrier generator 123. The input to carrier generator 123 is the output of voltage controlled crystal oscillator 124. The output of filter 120 is coupled to one of the two inputs of phase detector 125. The output of mixer 122 is coupled to the input of mid pass filter 126 and the output of filter 126 is coupled to one of the two inputs of mixer 127. The second input to mixer 127 is the output of oscillator 124, hereinafter called $F_1$. The aforementioned $F_1$ signal is also coupled to the input of generator 123. The output of mixer 127 is coupled to the input of 3400 Hz filter 128 and the output of filter 128 is coupled to the input of amplifier 129. The output of amplifier 129 will be the voice and/or data signals that were transmitted by transmitter 100 (not shown). Mixer 127 has a second output which is coupled to the input of a midpass filter 130 having a frequency of 3825 Hz. Filter 130 has two outputs. One output of filter 130 is coupled to the second input of phase detector 125 and the second output of filter 130 is coupled to the input of signaling detector 131. The output of phase detector 125 is coupled to the input of oscillator 124. The output of detector 131 is a signaling output which indicates when a microphone key or data transmission key is closed on transmitter 100, i.e., when voice or data is going to be transmitted.

Filter 122 is used to remove any noise components that are above the base band signal. The base band signal is approximately 2.54 MHz wide. Mixer 122 mixes the output of filter 121 with the $F_2$ output of carrier generator 123. The $F_2$ output of generator 123 is selectable. $F_2$ will be selected to represent the frequency for channel 100, i.e., 6,000 KHz. If the two inputs to mixer 122 have a frequency difference which falls within the passband limits of filter 126, receiver 300 will be processing the signals for channel 100. Thus, filter 121, mixer 122, generator 123 and filter 126 act as a channel selector.

If a message (voice or data) is being transmitted by transmitter 100, switch 108 (FIG. 2) would be closed and a translated 3825 Hz signaling tone would be transmitted with the above mentioned composite signal and direct 3825 Hz, via link 103 to the input of filters 120 and 121. Filter 120 passes the direct 3825 Hz signal and receiver channel 100 down converts the translated 3825 Hz signal. Phase detector 125 receives both 3825 Hz signals and its output controls oscillator 124 and adjusts its frequency and phase to control the overall channel phase characteristics. This is performed in the following manner. Oscillator 124 will transmit a signal representing $F_1$ to one of the inputs of mixer 127 and one of the inputs of generator 123. Mixer 127 will mix the $F_1$ signal with the output of filter 126. The output of mixer 127 will be transmitted to the input of filter 130. Filter 130 filters its input signal and transmits its output via line 140 to one of the inputs of phase detector 125. Phase detector 125 compares the phase of the signals that it receives from filter 120 and filter 130. If the two inputs to detector 125 are out of phase, the output of detector 125 will cause voltage controlled crystal oscillator 124 ($F_1$) to adjust its output frequency and phase. Frequency $F_1$ is also used by generator 123 as a reference frequency for frequency $F_2$. Oscillator 123 adjusts $F_1$ to cause $F_2$ to change in such a manner that the outputs of filters 120 and 130 will be in phase. Thus, oscillator 124 tunes the frequencies $F_1$ and $F_2$ and aligns the phase of the outputs of filters 120 and 130. The output of filter 130 is also coupled to the input of signaling detector 131. The output of detector 131 indicates that a voice or data signal is going to be transmitted from transmitter 100. The output of filter 128 is coupled to the input of amplifier 129 and the output of amplifier 129 is the amplified voice or data signals for channel 100.

The above specification describes a new and improved phase controlled frequency division multiplex communication system. It is realized that the above description may indicate to those skilled in the art additional ways in which the principles of this invention may be used without departing from its spirit. It is, therefore, intended that this invention be limited only by the scope of the appended claims.

What is claimed is:

1. A frequency division multiplexed, transmission system providing a predictable input to output phase characteristic for signals transmitted over a communications link between a transmitter and a receiver,
    (a) said transmitter including means for transmitting a composite signal including:
        (i) a first portion including at least one frequency translated multi-component signal including an information signal component and an out of band signalling tone component, and
        (ii) a second portion comprising an out of band signalling tone,
    (b) said receiver including:
        (i) a phase controlled oscillator,
        (ii) means responsive to said phase controlled oscillator and to said transmitted composite signal for frequency retranslating said multi-component signal to produce a received information signal and a received out of band signalling tone, and
        (iii) phase comparison means responsive to said received out of band signalling tone and to said out of band signalling tone of said second portion of said transmitted signal for controlling said phase controlled oscillator.

2. A system as recited in claim 1 in which said transmitter includes:
    a pass band filter defining a first frequency bandwidth passed by said said pass band filter,
    information frequency limiting filter means to limit said information signal to a second frequency bandwidth less than said first frequency bandwidth, and
    a source of said out of band signalling tone of frequency outside said second frequency bandwidth but within said first frequency bandwidth.

3. A single sideband, frequency division multiplexed, transmission system providing a predictable input to output phase characteristic for signals transmitted over a communications link between a transmit and a receive location, said system including:
    a transmitter at said transmit location including channel transmitter means and a source of an out of band signalling tone,
    said channel transmitter means subject to an information signal to be transmitted and said out of band signalling tone for producing a modulated composite signal representing a frequency translation of both said information signal and said out of band signalling tone,
    said transmitter further including summing means with an input from said channel transmitter means and a further input subject to said out of band signalling tone for producing a transmitted signal representing a sum of said modulated composite signals and said out of band signalling tone,
    a receiver at said receive location including channel receiver means and a phase comparison means, said receiver including means for coupling a signal received over said communication link as an input to said channel receiver means and means for coupling said out of band signalling tone component of said received signal to said phase comparison means,
    said channel receiver means for providing, as an output, a frequency retranslation of said input and including as a component of said output a frequency retranslated out of band signaling tone, said channel receiver means including a phase controlled oscillator to control said frequency retranslation, and
    said phase comparison means comparing said frequency retranslated out of band signalling tone component of said channel receiver means output with said out of band signalling tone for controlling said phase controlled oscillator.

4. A system as recited in claim 3 in which said transmitter includes a plurality of said channel transmitter means and in which said receiver includes a plurality of said channel receiver means, and wherein each of said channel receiver means includes said phase comparison means.

5. A system as recited in claim 4 in which each of said channel transmitter means include an interchangeable frequency synthesizer, said frequency synthesizers in different channel transmitter means set to generate signals of different frequencies, and wherein said channel transmitter means further includes:
    two inputs, one coupled to said source of said out of band signalling tone and a second coupled to an information signal,
    first means for summing signals appearing at said two inputs,
    second means including said frequency synthesizer for generating upper and lower sidebands signals in response to an output of said first means,
    first filtering means responsive to said second means for filtering said upper or lower sideband signals,
    and wherein said receiver includes:
    second filtering means responsive to said transmitted signal for filtering said out of band signalling tone with an output coupled to said phase comparison means, and wherein each of said channel receiver means includes:

frequency retranslation means responsive to said transmitted signal for processing said upper or lower sideband signal to produce a composite signal comprising said information and said out of band signalling tone, third filtering means for separating, on a first output said information signal and on a second output said out of band signalling tone, coupling means connecting said second output of said third filtering means to said phase comparison means, and amplifying means responsive to said first output of said third filtering means for amplifying said transmitted information.

6. A system as recited in claim 5 in which said channel transmitter means includes switching means coupled between said first input and said first means for controlling application of said out of band signalling tone to said first means.

7. A system as recited in claim 5 wherein said second means includes:

said frequency synthesizer with a first output at a frequency of $F_1$ and second output at a frequency $F_2$, a first mixer with inputs from said first means and said first output of said frequency synthesizer, fourth filtering means coupled to an output of said first mixer for selectively passing either an upper or lower sideband from said first mixer, a second mixer with an input from said fourth filtering means and said second output of said frequency synthesizer, an output of said second mixer coupled to said first filtering means.

8. A system as recited in claim 5 wherein said frequency retranslation means includes:

fourth filtering means responsive to said transmitted signal for passing on a selected frequency limited portion thereof, a frequency synthesizer with an output at a frequency $F_2$, a first mixer with an input from said fourth filtering means and from said frequency synthesizer, fifth filtering means coupled to said third mixer for selectively passing an upper or a lower sideband, a second mixer with inputs from said fifth filtering means and from said phase controlled oscillator.

9. A system as recited in claim 5 in which said channel receiver means further comprises a signalling detector coupled to said second output of said third filtering means.

10. The system claimed in claim 8 wherein said switching means is a contact switch.

11. The system claimed in claim 2 wherein said first filtering means is a mid pass filter.

12. The system claimed in claim 5 wherein said first filtering means is a low pass filter.

* * * * *